United States Patent [19]

Springer

[11] Patent Number: 4,972,289
[45] Date of Patent: Nov. 20, 1990

[54] ELECTRIC MOTOR CONTROL AND PROTECTIVE ASSEMBLY FOR FLUID PUMP OPERATION

[75] Inventor: Lamar D. Springer, Spring Valley, Ohio

[73] Assignee: Spring Valley Associates, Dayton, Ohio

[21] Appl. No.: 383,601

[22] Filed: Jul. 24, 1989

Related U.S. Application Data

[63] Continuation-in-part of Ser. No. 243,886, Sep. 13, 1988, Pat. No. 4,885,655, which is a continuation-in-part of Ser. No. 106,048, Sep. 7, 1987, Pat. No. 4,841,404.

[51] Int. Cl.$^5$ .............................................. H05K 7/00
[52] U.S. Cl. ......................................... 361/23; 361/1; 361/333; 361/393
[58] Field of Search ................... 361/1, 23, 24, 25, 30, 361/31, 33, 22, 142, 56, 390, 394, 393, 331–334, 346, 352, 356; 318/17

[56] References Cited

U.S. PATENT DOCUMENTS

| | | |
|---|---|---|
| 2,953,722 | 9/1960 | Willis . |
| 3,417,290 | 12/1968 | Craddock .............................. 361/30 |
| 3,519,910 | 7/1970 | Pfaff et al. . |
| 3,600,657 | 8/1971 | Pfaff et al. ............................ 318/218 |
| 3,727,103 | 4/1973 | Finch, et al. .......................... 361/30 |
| 3,931,559 | 1/1976 | McKee ................................. 318/455 |
| 3,953,777 | 4/1976 | McKee ................................. 318/474 |
| 4,034,269 | 5/1977 | Wilkinson ............................ 361/79 |
| 4,068,279 | 1/1978 | Byrnes ................................. 361/56 |
| 4,091,433 | 5/1978 | Wilkinson ............................ 361/76 |
| 4,117,408 | 9/1978 | Comstedt ............................. 328/133 |
| 4,286,925 | 9/1981 | Standish .............................. 417/12 |
| 4,290,007 | 9/1981 | Fisher et al. ......................... 323/270 |
| 4,420,787 | 12/1983 | Tibbits et al. ........................ 361/79 |
| 4,642,478 | 2/1987 | Noth ................................... 307/118 |
| 4,703,387 | 10/1987 | Miller .................................. 361/79 |

Primary Examiner—Todd E. DeBoer
Attorney, Agent, or Firm—Jacox & Meckstroth

[57] ABSTRACT

A combination electric motor control and pump protective assembly in which a protective unit is readily inserted as a module into an existing motor control unit. The units which form the single combined assembly are electrically attached together by blade and socket members to which electrical devices are connected. Thus, a pump protective unit can be quickly and readily added to an existing motor control unit which is mounted upon support structure. Therefore, a motor control unit and a pump protective unit is quickly formed into a combined assembly upon existing support structure, without the mounting of an additional member upon support structure and without additional wiring.

14 Claims, 2 Drawing Sheets

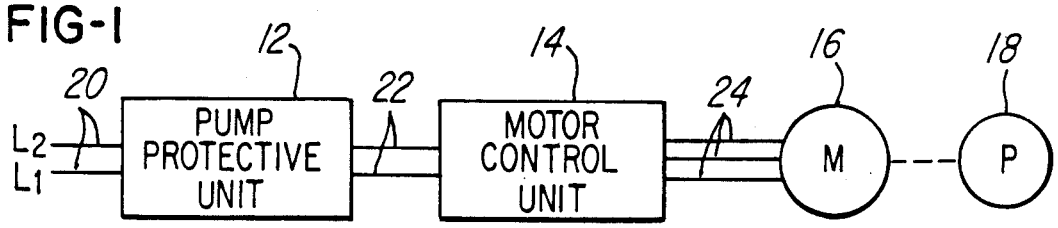
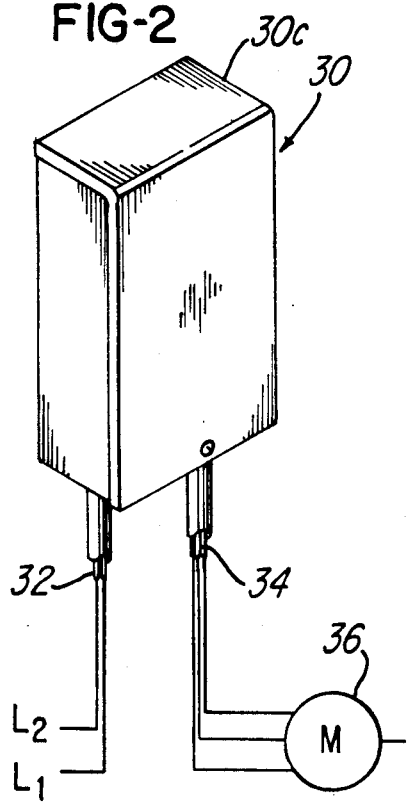
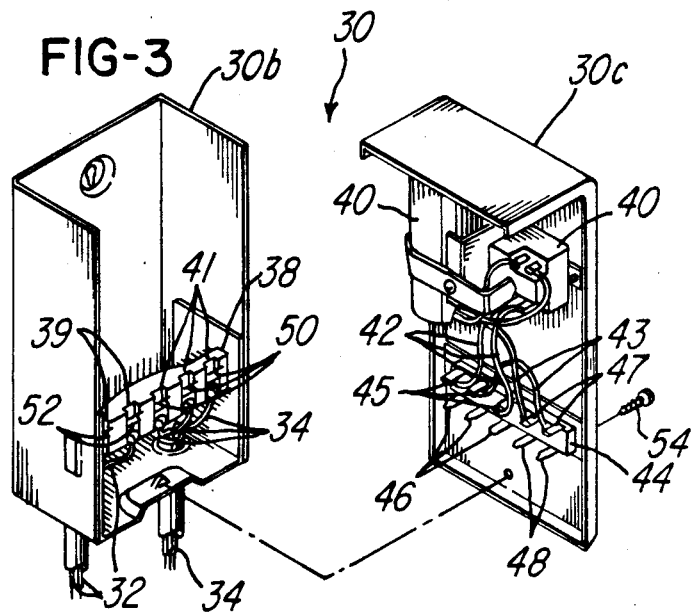
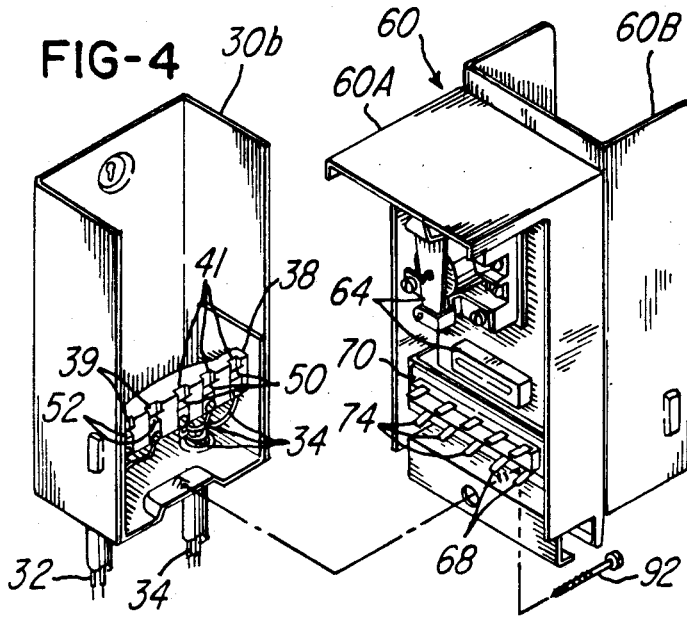
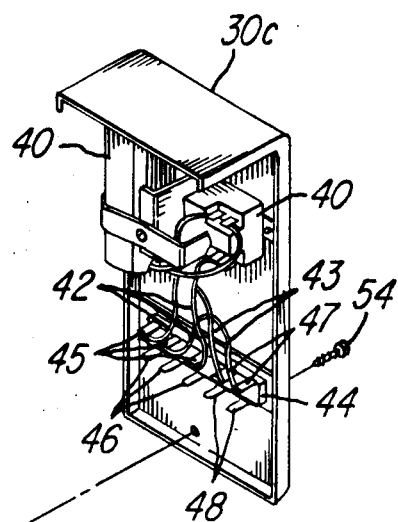

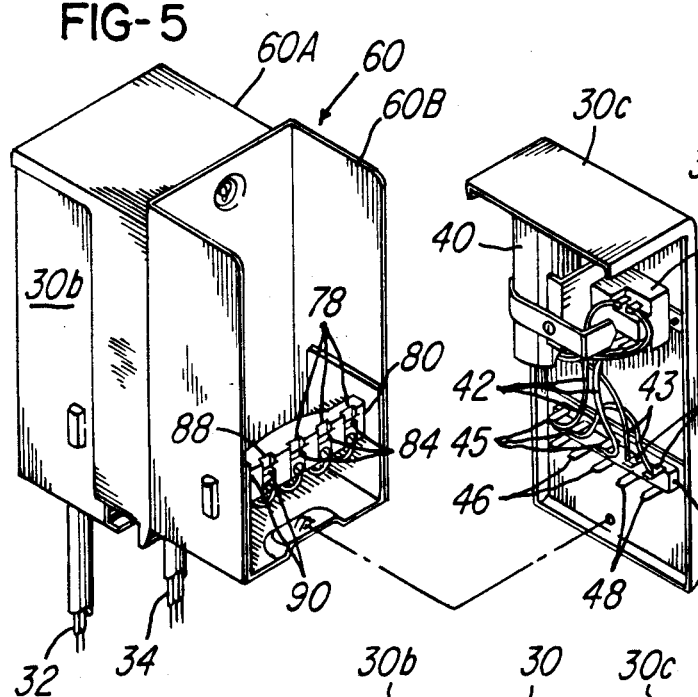
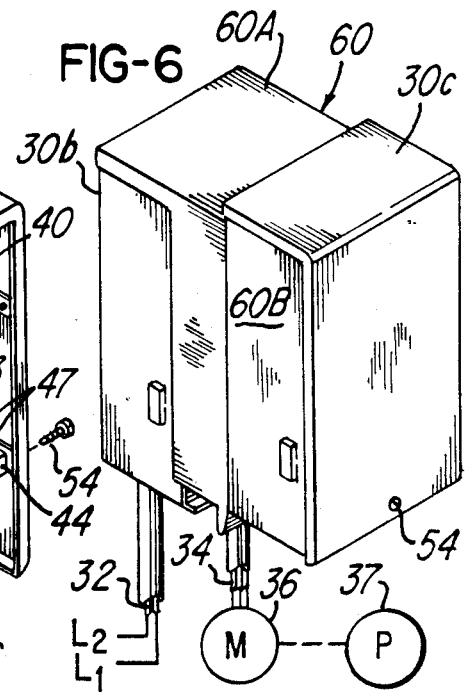
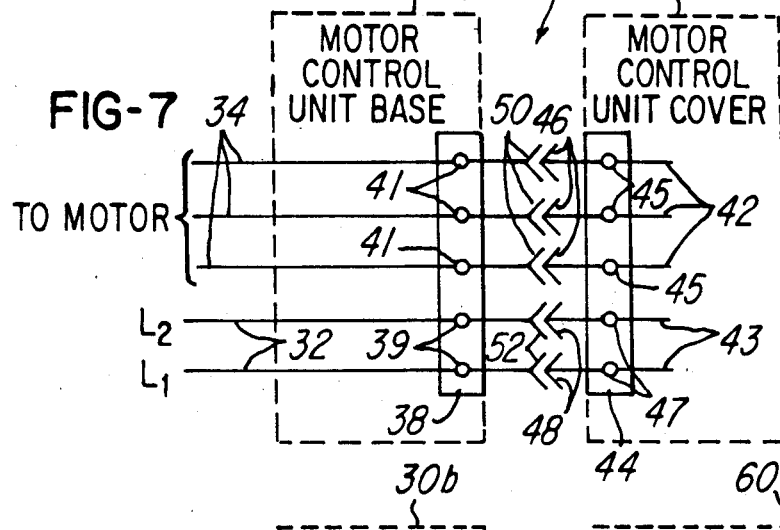
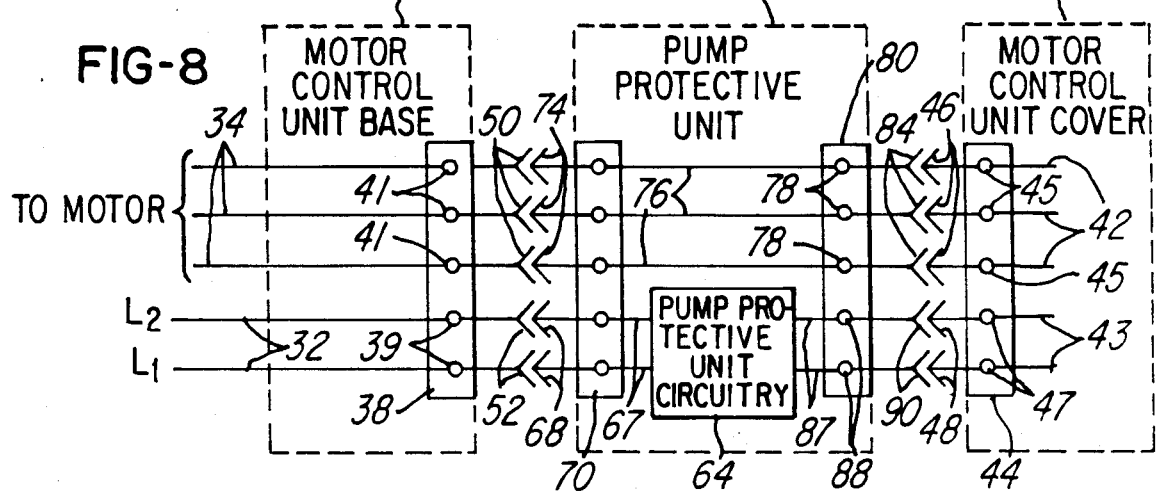

ELECTRIC MOTOR CONTROL AND PROTECTIVE ASSEMBLY FOR FLUID PUMP OPERATION

RELATED APPLICATION

This application is a continuation-in-part of application Ser. No. 243,886, filed Sept. 13, 1988 now U.S. Pat. No. 4,885,655, which is a continuation-in-part of application Ser. No. 106,048, filed Sept. 7, 1987, now U.S. Pat. No. 4,841,404.

BACKGROUND OF THE INVENTION

In numerous installations, a water pump and the electric motor which operates the pump are submerged within the body of water from which water is pumped. In some water pump installations, a water pump and an electric driving motor may be located a considerable distance from the electric control unit which supplies electrical energy to the electric motor. In each water pump installation, there is a possibility that the supply of water at the pump may cease or a coupling between the driving electric motor and the water pump may break, or for some other reason the electric motor operates without pumping operation of the water pump. If the supply of water to the water pump ceases, the pump may be severely damaged if it is operated. If the coupling between the electric motor breaks or for some other reason the pump is operated without pumping action, a signal should be provided in regard to such a condition, and/or the motor should be deenergized. However, numerous electric motors which operate water pumps have no protection against a condition in which the motor is operating while the pump is not pumping water. Therefore, such installations endanger the electric motor.

Also, most installations which include means for protection of a water pump employ a motor control unit which is attached to support structure and also employ a pump protective unit which is separately attached to the support structure adjacent the motor control unit. The pump protective unit is electrically connected to the motor control unit. Thus, there are at least two units mounted upon support structure. Electric wires from a source of electrical energy are connected to the protective unit. Then electric wires are extended from the pump protective unit to the motor control unit, and the wires are connected to the pump protective unit and to the motor control unit. Then, electric wires are extended from the motor control unit to the electric motor, and the wires are connected to the motor control unit and to the electric motor. Therefore, a plurality of units are mounted upon support structure and numerous electric wires are attached to the units and extend to and from the units and to the electric motor.

U.S. Patents which show protective electrical circuitry are U.S. Pat. Nos. 2,953,722, 3,417,290, 3,519,910, 3,600,657, 3,727,103, 3,931,559, 3,953,777, 4,034,269, 4,091,433, 4,117,408, 4,286,925, 4,290,007, 4,420,787, 4,642,478, 4,703,387.

However, none of these patents shows structure in which a protective unit, as a module, is readily attachable to a motor control unit to form a combined assembly, without the mounting of an additional unit upon support structure, and without the necessity of additional conventional wiring.

It is an object of this invention to provide means and a method by which an electric motor control unit which is mounted upon support structure can be readily and easily equipped with pump protection means without the necessity of mounting a separate motor protective unit upon the support structure and without the necessity of attaching conventional electric wires between the motor protective unit and the motor control unit.

Another object of this invention is to provide a pump protective unit which constitutes a module which is readily attachable to an electric motor control unit.

Another object of this invention is to provide a plug-in type electric motor protective unit which is adapted to plug-in to an electric motor control unit which is mounted upon support structure whereby the two units become a single assembly, without the necessity for conventional mounting and without the necessity of conventional electric wires between the units.

Other objects and advantages of this invention reside in the construction of parts, the combination thereof, the method of construction and assembly and the mode of use, as will become more apparent from the following description.

SUMMARY OF THE INVENTION

This invention pertains to an electric motor and to a fluid pump which is operated by the electric motor. The invention comprises an adapter or module which provides pump protection and which can be readily inserted into an electric motor control unit. The adapter or module of this invention includes pump protective electrical circuitry and includes plug-in elements for insertion of the pump protective circuitry into the electric motor control unit. Thus, a single assembly is created which serves both as pump protective means and as motor control means. The single assembly is created easily and readily, and the single assembly is adapted to be mounted upon support structure, and without connection of conventional electric wires between the units of the assembly.

BRIEF DESCRIPTION OF THE VIEWS OF THE DRAWINGS

FIG. 1 is a diagrammatic view illustrating a prior art type of installation in which a pump protective unit and an electric motor control unit are separately mounted upon support structure, and the pump protective unit and the motor control unit are electrically wired together and connected to an electric motor which operates a fluid pump.

FIG. 2 is a perspective view showing a prior art electric motor control unit which has power input conductors and motor connection conductors connected thereto and which controls starting and stopping operation of an electric motor which operates a pump.

FIG. 3 is a perspective exploded view, drawn on substantially the same scale as FIG. 2, illustrating the manner by which two parts of the prior art motor control unit of FIG. 2 are attached together, electrically and mechanically.

FIG. 4 is an exploded perspective view, drawn on substantially the same scale as FIGS. 2 and 3, showing a pump protective unit of this invention. This view also shows the motor control unit of FIGS. 2 and 3 and illustrates the manner by which the pump protective unit of this invention is connected electrically and mechanically to the motor control unit of FIGS. 2 and 3 to form a single assembly which comprises the motor control unit and the pump protective unit.

FIG. 5 is a perspective view, drawn on substantially the same scale as FIGS. 2, 3, and 4, illustrating a step in attachment of the pump protective unit to the motor control unit to form a single assembly.

FIG. 6 is a perspective view, drawn on substantially the same scale as FIGS. 2-5, showing the pump protective unit and the motor control unit attached together electrically and mechanically as a single assembly.

FIG. 7 is a diagrammatic wiring and connection view illustrating the manner in which two parts of the prior art electric motor control unit of FIGS. 2, and 3 are attached together electrically.

FIG. 8 is a diagrammatic wiring and connection views illustrating the manner in which a pump protective unit of this invention is electrically connected to the motor control unit of FIGS. 1, 2, and 3 to provide a single assembly.

DETAILED DESCRIPTION OF THE PREFERRED EMBODIMENT

FIG. 1 illustrates a prior art assembly in which a pump protective unit 12 is connected to an electric motor control unit 14. The electric motor control unit 14 and the protective unit 12 are two separate units which are separately mounted upon support structure. The electric motor control unit 14 may be any suitable unit for energization and deenergization of an electric motor, such as an electric motor 16 which is connected to a fluid pump 18 for operation of the pump 18.

The pump protective unit 12 includes protective circuitry for protection of the pump 18 and the electric motor 16 against a situation in which the pump 18 is not pumping liquid.

As illustrated in FIG. 1, power supply wires 20, shown herein as $L_1$ and $L_2$, are connected to the protective unit 12. Electric wires 22 are connected to the protective unit 12 and to the motor control unit 14 and extend therebetween.

Electric wires 24 are attached to the motor control unit 14 and to the electric motor 16 and extend therebetween. The protective unit 12 deenergizes the motor control unit 14 if the protective unit 12 senses that the motor 16 is operating while the pump 18 is not pumping fluid. Thus, the liquid pump 18 and the electric motor 16 are protected against a situation in which the pump 18 is not pumping liquid.

The arrangement illustrated in FIG. 1 is suitable for protection of the electric motor 16 and the liquid pump 18. However, as shown, the units 12 and 14 are separately mounted upon support means, and several electric wires 22 and 24 are connected therebetween and to the motor 16. Thus, installation of the units 12 and 14 and connection thereof to the motor 16 is involved and time consuming. Furthermore, space upon support structure is required for mounting both the protective unit 12 and the motor control unit 14.

For these reasons, inter alia, numerous electric motor and pump installations do not include pump motor protective means. For example, FIGS. 2 and 3 show a motor control unit 30, to which power supply lines 32 are connected and from which wires 34 extend to an electric motor 36 which operates a fluid pump 37. The unit 30 of FIGS. 2 and 3 includes no pump protection means.

The motor control unit 30 of FIGS. 2, 3, and 7 includes a base 30b and a cover 30c. Within the base 30b is a connection block 38. The power supply lines 32 ($L_1$ and $L_2$) are connected to terminals 39 of the connection block 38, and the wires 34 are connected to terminals 41 of the connection block 38 and extend from the base 30b. FIG. 3 illustrates the manner in which the parts of 30b and 30c of the motor control unit 30 are connected together mechanically and electrically. FIG. 7 illustrates the manner in which the parts 30b and 30c of the motor control unit 30 are connected together electrically.

Mounted within the cover 30c of the motor control unit 30 are motor starter and control elements 40. Joined to the motor starter and control elements 40 are wires 42 and 43 which extend from the starter and control elements 40. The wires 42 are attached to terminals 45 of a connection block 44, and the wires 43 are connected to terminals 47 of the connection block 44. The connection block 44 includes protuberant blades 46 which are electrically and physically connected to the terminals 45. The connection block 44 includes blades 48 which are electrically and physically connected to the terminals 47.

The blades 46 and 48 and the connection block 44 of the cover 30c are adapted to enter slotted openings or receptacles 50 and 52, respectively in the connection block 38 in the base 30b, as illustrated in FIGS. 3 and 7. In attaching the cover 30c to the base 30b of the prior art unit 30, the blades 46 of the connection block 44 are inserted into the slotted receptacles 50, and the blades 48 are inserted into the slotted receptacles 52 of the connection block 38 of the base 30b.

As this electrical connection process occurs, the cover 30c is placed into engagement with the base 30b. Thus, the motor starter and control elements 40, which are electrically connected to the connection block 44, become electrically connected to the connection block 38 and to the wires 32 and 34 when the cover 30c is placed into engagement with the base 30b to enclose the base 30b. These electrical connections are illustrated diagrammatically in FIG. 7.

For physical securing of the cover 30c to the base 30b a screw 54 attaches the cover 30c to the base 30b. When the base 30b is closed by the cover 30c, the motor control unit 30 has the appearance shown in FIG. 2, and there is no provision. For protection of the pump 37.

This invention provides means by which a motor control unit, such as the motor control unit 30, is quickly and easily equipped with pump protection means.

FIGS. 4 and 5 show a pump protective unit 60 of this invention. The pump protective unit 60 is shown as comprising a housing member 60A and a housing member 60B which are attached together in back-to-back relationship. However, the housing members 60A and 60B may comprise a single housing. The housing member 60A encloses pump protective circuitry 64 which is connected by electrical conductors 67, shown in FIG. 8, to protuberant blades 68 which are mounted upon a connection block 70, shown in FIGS. 4 and 8. Preferably, the pump protective unit 60 includes protective circuitry such as that disclosed in U.S. Pat. No. 4,420,787.

The connection block 70 also has blades 74 to which are connected wires 76, shown in FIG. 8. The protective unit 60 also has a connection block 80, shown in FIGS. 5 and 8. The wires 76 are also connected to terminals 78 of the connection block 80. The terminals 78 are electrically and mechanically connected to slotted receptacles 84 in the terminal block 80. The pump protective circuitry and elements 64 are also connected by wires 87, shown in FIG. 8, to terminals 88 on the connection block 80. The terminals 88 are connected electrically and mechanically to slotted receptacles 90 in the connection block 80.

The blades 68 of the connection block 70 of the protective unit 60 are adapted to be inserted into the slotted receptacles 52 in the connection block 38 of the base 30b. The blades 74 of the connection block 70 of the protective unit 60 are adapted to be inserted into the slotted receptacles 50 of the base 30b. The blades 46 and 48 of the connection block 44 of the cover 30c are adapted to be inserted into the slotted receptacles 84 and 90, respectively, of the connection block 80 of the protective unit 60. The blades 74 and 68 of the connection block 70 of the protective unit 60 are adapted to be inserted into the slotted receptacles 50 and 52, respectively of the connection block 38 of the base 30b. Thus, the protective unit 60 becomes a part of the motor control unit 30, and the combined units 60 and 30 have the appearance shown in FIG. 6 and function together as a single assembly, as illustrated in FIG. 4, 5, 6, and 8.

As illustrated in FIG. 4, the screw 54 attaches the cover 30c of the motor control unit 30 to the protective unit 60, and a screw 92 attaches the protective unit 60 to the base 30b of the motor control unit 30.

Thus, the protective unit 60 readily becomes a part of the motor control unit 30, without the necessity of additional mounting upon support structure and without the necessity of attaching additional wires in a conventional manner.

Although the preferred embodiment of the electric motor control and protective assembly of this invention has been described, it will be understood that within the purview of this invention various changes may be made in the form, details, proportion and arrangement of elements, the combination thereof, and the mode and method of operation, which generally stated consist in an electric motor control and protective assembly and method of this invention within the scope of the appended claims.

The invention having thus been described, the following is claimed:

1. An electric motor control and protective assembly for fluid pump operation comprising a base unit adapted to be mounted upon support structure, the base unit including a plurality of base electric connection elements, each base electric connection element having a base electric connection receptor opening, a plurality of the base electric connection elements being adapted to receive power source input conductors for attachment of the power source input conductors to the base electric connection elements, a plurality of the base electric connection elements being adapted to have attached thereto electric motor conductors which are connected to an electric motor which operates a fluid pump, a pump protective unit including protective electrical circuitry, the pump protective unit also including a plurality of protection connection blades, connection means connecting a plurality of the protection connection blades to the protective electrical circuitry, the pump protective unit also including a plurality of protection connection receptor elements, each protection connection receptor element having an electrical connection receptor opening, electric conductor means connecting a plurality of the protection connection receptor elements to a plurality of the protection connection blades, a motor control unit provided with motor control circuitry, the motor control unit including a plurality of motor control electric connection blades, conductor means connecting the motor control circuitry to a plurality of the motor control connection blades, the motor control unit being electrically connectable to the pump protective unit as the motor control electric connection blades of the motor control unit are inserted into the electrical connection receptor openings of the protection connection receptor elements of the pump protective unit, the pump protective unit being electrically connectable to the base unit as the protection connection blades of the pump protective unit are inserted into the base electric connection receptor openings of the base electric connection elements of the base unit, whereby the base unit and the protective unit and the motor control unit become a single assembly.

2. The electric motor control and protective assembly of claim 1 in which the base unit includes housing means.

3. The electric motor control and protective assembly of claim 1 in which the pump protective unit includes housing means.

4. The electric motor control and protective assembly of claim 1 in which the motor control unit includes housing means.

5. The electric motor control and protective assembly of claim 1 in which the base unit and the pump protective unit and the motor control unit include housing means enclosing all of the units.

6. The electric motor control and protective assembly of claim 1 in which a plurality of the motor control electric connection blades is inserted into the electrical connection receptor openings of the protection connection receptor elements which are connected to the electric conductor means which are also connected to the protection connection blades.

7. The method of connecting a liquid pump protection unit to an electrical motor starter unit in which the electric motor starter unit includes a base member attachable to support structure for support thereby, and in which the base member of the electric motor starter unit includes a base terminal block to which electric energy conductors are connected and in which the base terminal block of the electric motor starter unit has motor connection conductors attached thereto and in which the base terminal block has at least one electrical connection receptor opening, and in which the electrical motor starter unit also includes an electric motor starter and control member which is provided with electrical motor starter and control circuitry, and in which the electric motor starter and control member includes an electric starter and control connection block having at least one protuberant connection blade to which the electrical motor starter and control circuitry is connected, the electrical motor starter and control member being adapted to be electrically connected to the base member as each protuberant connection blade of the electrical motor starter and control member is inserted into an electrical connection receptor opening of the base terminal block, the method comprising providing a pump protective member which includes protective electrical circuitry and which includes protective connection elements, at least one of the protective connection elements having a connection receptor opening at least one of the protective connection elements including a protuberant connection blade, the protective electrical circuitry being connected to the protective connection elements, the method also including connecting the pump protective member to the base member of the electric motor starter unit by inserting each protuberant connection blade of the electric motor starter and control member into a connection receptor opening of a protective connection element of the pump protective member, the method also including inserting each protuberant connection blade of the protective connection elements of the pump protective member into an electrical connection receptor opening of the base terminal block of the electric motor starter unit, whereby the pump protective member and the electric motor starter unit become a single combined assembly for attachment of the base member of the electric motor starter unit to support structure.

8. An electric motor control and protective assembly for fluid pump operation in which a motor control unit is provided with a first control member and a second control member and in which one of the control members is attachable to support structure and has connection means for attachment to power input conductors and which also has connection means for attachment thereto of electric conductors which are attached to an electric motor, one of the control members including protuberant connection means and one of the control members including receptor connection means, the improvement comprising a protective unit which includes protective electrical circuitry, the protective unit including first and second connection means which are electrically joined to the protective electrical circuitry, one of the connection means of the protective unit including receptor electrical connection means and the other connection means of the protective unit including protuberant electrical connection means, the protective unit being connected electrically to the first control member and to the second control member as the protuberant electrical connection means of the protective unit are inserted into the receptor connection means of said one of the control members and as the receptor connection means of the protective unit receives the protuberant connection means of the other control member.

9. The electric motor control and protective assembly of claim 8 which includes a housing means which encloses the protective unit.

10. The electric motor control and protective assembly of claim 8 which includes housing means which encloses the first control member.

11. The electric motor control and protective assembly of claim 8 which includes housing means which encloses the second control member.

12. The method of connecting a liquid pump protection unit to an electrical motor starter unit in which the electric motor starter unit includes a base member attachable to support structure for support thereby, and in which the base member of the electric motor starter unit includes a base terminal block to which electric energy input conductors are connected and in which the base terminal block of the electric motor starter unit has motor connection conductors attached thereto which motor connection conductors are also attached to an electric motor, and in which the base terminal block has electrical plug-in connection elements, and in which the electrical motor starter unit also includes an electric motor starter and control member which is provided with electrical motor starter and control circuitry, and in which the electric motor starter and control member includes an electric starter and control connection block having plug-in connection elements to which the electrical motor starter and control circuitry is connected, the electrical motor starter and control member being adapted to be electrically connected to the base member as the plug-in connection elements of the electrical motor starter and control member are connected to the plug-in connection elements of the base terminal block, the method comprising providing a pump protective member which includes protective electrical circuitry and which includes protective plug-in connection elements, the protective electrical circuitry being electrically connected to the protective connection elements, the method also including connecting the pump protective member to the base member of the electric motor starter unit by connecting the plug-in connection elements of the electric motor starter and control member to the plug-in connection elements of the pump protective member, whereby the pump protective member and the electric motor starter unit become a single combined assembly as the base member of the electric motor starter unit is adapted to be supported by support structure.

13. The method of connecting a liquid pump protection unit to an electrical starter unit in which the electric motor starter unit includes a base member attachable to support structure for support thereby, and in which the base member of the electric motor starter unit includes a base terminal block to which electric energy input conductors are connected and in which the base terminal block of the electric motor starter unit has motor connection conductors attached thereto and in which the base terminal block has electrical connection receptor openings, and in which the electrical motor starter unit also includes an electric motor starter and control member which is provided with electrical motor starter and control circuitry, and in which the electric motor starter and control member includes an electric motor starter and control connection block having protuberant connection blades to which the electrical motor starter and control circuitry is connected, the electrical motor starter and control member being adapted to be electrically connected to the base member as the protuberant connection blades of the electrical motor starter and control member are inserted into the electrical connection receptor openings of the base terminal block, the method comprising providing a liquid pump protective member which includes protective electrical circuitry and which includes protective connection elements having connection receptor openings and protective connection elements having protuberant blades, the protective electrical circuitry being connected to the protective connection elements, the method also including connecting the liquid pump protective member to the base member of the electric motor starter unit by inserting the protuberant connection blades of the electric motor starter and control member into the connection receptor openings of protective connection elements of the pump protective member, the method also including inserting the protuberant blades of the protective connection elements of the pump protective member into the electrical connection openings of the base terminal block of the electric motor starter unit, whereby the pump protective member and the electric motor starter unit become a single combined assembly.

14. An electric motor control and protective assembly for liquid pump operation comprising an electric motor control unit which includes a base member which is attachable to support structure for support thereby, the base member including a base terminal block having connection elements which are adapted to receive power source electrical conductors for attachment of the power source electrical conductors to connection elements of the base terminal block, the base terminal block also having connection elements which are adapted to receive electric conductors which are attached thereto and which extend to an electric motor which operates a liquid pump, the base terminal block having at least one electrical receptor opening, the electric motor control unit also including an electric motor starter member, the electric motor starter member including a control connection block and motor control circuitry, the motor control circuitry being electrically connected to the control connection block, the control connection block having at least one protuberant connection blade, the electric motor starter member being adapted to be connected to the base member as each control connection blade of the base terminal block of the electric motor starter member is inserted into each electrical receptor opening of the base terminal block of the base member, the assembly also including a liquid pump protective unit which includes protective circuitry and which includes protective connection elements to which the protective circuitry is electrically connected, at least one of the protection connection elements having a receptor opening and at least one of the protection connection elements having a protuberant blade, the protective circuitry of the pump protective unit being connected to the base member of the electric motor control unit as each protuberant blade of the protection connection elements of the pump protective unit is inserted into an electrical receptor opening of the base terminal block of the base member of the electric motor control unit, the protective circuitry of the pump protective unit being connected to the electric motor starter member as a protuberant connection blade of the control connection block of the electric motor starter member is inserted into a receptor opening of a protective element of the pump protective unit, the pump protective unit thus being electrically connected to the base member of the electric motor control unit and to the electric motor starter member, whereby the protective unit and the electric motor control unit are a single assembly.

* * * * *